US009728089B2

(12) United States Patent
Marcus (10) Patent No.: US 9,728,089 B2
(45) Date of Patent: Aug. 8, 2017

(54) SYSTEM AND METHOD FOR CONTROLLING AUTONOMOUS FLYING VEHICLE FLIGHT PATHS

(71) Applicant: AirMap, Inc., Santa Monica, CA (US)

(72) Inventor: Benjamin Daniel Marcus, Santa Monica, CA (US)

(73) Assignee: AirMap, Inc., Santa Monica, CA (US)

( * ) Notice: Subject to any disclaimer, the term of this patent is extended or adjusted under 35 U.S.C. 154(b) by 0 days.

(21) Appl. No.: 14/984,023

(22) Filed: Dec. 30, 2015

(65) Prior Publication Data

US 2016/0189549 A1 Jun. 30, 2016

Related U.S. Application Data (60) Provisional application No. 62/098,968, filed on Dec. 31, 2014.

(51) Int. Cl.
   - *B64D 45/00* (2006.01)
   - *G08G 5/00* (2006.01)
   - *B64C 39/02* (2006.01)

(52) U.S. Cl.
   CPC ......... *G08G 5/0034* (2013.01); *B64C 39/024* (2013.01); *G08G 5/006* (2013.01);
   (Continued)

(58) Field of Classification Search
   CPC ....... B64C 39/024; H04N 5/225; G01S 17/66; G01S 13/95; G01S 17/023;
   (Continued)

(56) References Cited

U.S. PATENT DOCUMENTS

2009/0210109 A1* 8/2009 Ravenscroft ......... G01C 21/005
  701/26
2009/0322585 A1* 12/2009 Galasso .............. F41H 13/0056
  342/14

(Continued)

FOREIGN PATENT DOCUMENTS

JP  2007237873 A * 9/2007 ............ B64D 45/00
WO  WO2016109646 A2  7/2016

OTHER PUBLICATIONS

International Search Report dated Feb. 25, 2016 in Patent Cooperation Treaty Application No. PCT/US2015/068029.

*Primary Examiner* — Yuri Kan
(74) *Attorney, Agent, or Firm* — Morrison and Foerster LLP (57) ABSTRACT

A method is provided for limiting access to airspace by drones. The method includes receiving position information from a user associated with a property identified by the position information. The method also includes assembling the position information with other position information to compile a comprehensive configurable flight zone database. The method further includes pushing the configurable flight zone database to at least one drone. The drone accesses the configurable flight zone database to determine if movement is allowed, and the drone is programmed to not fly into areas identified in the configurable flight zone database. In the method, the drone may be further programmed to prohibit directing a camera into the areas identified in the configurable flight zone database.

20 Claims, 5 Drawing Sheets

(52) U.S. Cl.
CPC ......... *G08G 5/0008* (2013.01); *G08G 5/0013* (2013.01); *G08G 5/0039* (2013.01); *G08G 5/0069* (2013.01); *G08G 5/0078* (2013.01); *G08G 5/0091* (2013.01); *B64C 2201/123* (2013.01); *B64C 2201/141* (2013.01)

(58) Field of Classification Search
CPC ............ H04B 7/18506; G06Q 30/0611; B64D 45/00; G08G 5/0034; G08G 5/0069; G08G 5/0039; G01C 23/00; G01C 21/00; G01C 21/005; F41H 13/0056
USPC .................... 701/2, 3; 348/36, 143; 455/431
See application file for complete search history.

(56) References Cited

U.S. PATENT DOCUMENTS

| | | | | |
|---|---|---|---|---|
| 2010/0283848 | A1* | 11/2010 | Adler | G01S 17/66 348/143 |
| 2010/0292871 | A1* | 11/2010 | Schultz | G01C 21/00 701/3 |
| 2011/0164108 | A1* | 7/2011 | Bates | H04N 5/225 348/36 |
| 2012/0245834 | A1* | 9/2012 | Klooster | G08G 5/0039 701/120 |
| 2013/0231803 | A1* | 9/2013 | Barraci | G01C 23/00 701/3 |
| 2013/0317667 | A1* | 11/2013 | Kruglick | B64C 39/024 701/2 |
| 2014/0018979 | A1* | 1/2014 | Goossen | G08G 5/0034 701/3 |
| 2014/0316614 | A1* | 10/2014 | Newman | G06Q 30/0611 701/3 |
| 2015/0310747 | A1* | 10/2015 | Frolik | B64D 45/00 340/971 |
| 2016/0050011 | A1* | 2/2016 | Frolov | H04B 7/18506 455/431 |
| 2016/0131758 | A1* | 5/2016 | Christianson | G01S 13/95 342/26 R |
| 2016/0140851 | A1* | 5/2016 | Levy | G08G 5/0069 701/3 |
| 2017/0018058 | A1* | 1/2017 | Spinelli | G01S 17/023 |

* cited by examiner

SYSTEM AND METHOD FOR CONTROLLING AUTONOMOUS FLYING VEHICLE FLIGHT PATHS

CROSS REFERENCE TO RELATED APPLICATIONS

This application claims the benefit and priority of U.S. Provisional Application Ser. No. 62/098,968, filed on Dec. 31, 2014, entitled "System and Method For Personal Airspace Exclusion Zones," which is hereby incorporated herein in its entirety including all references and appendices cited therein.

FIELD OF THE INVENTION

The disclosure of this application is directed generally to drone control and management, and more specifically but not by way of limitation, to systems and methods for controlling drone operation using configurable flight zones and other flight path automation processes.

SUMMARY

According to some embodiments, the present disclosure is directed to a method, comprising: (a) receiving a proposed flight area for a drone; (b) generating an approved flight plan for the drone by: (i) comparing the proposed flight area to a comprehensive configurable flight zone database that comprises position information for locations that are designated as configurable flight zones; and (ii) determining the approved flight plan which comprises a flight path that excludes the locations that are designated as configurable flight zones that fall within the proposed flight area; and (c) pushing the approved flight plan to at least one drone.

According to some embodiments, the present disclosure is directed to a flying drone device, comprising: (a) a processor; and (b) a memory for storing logic, the processor executing the logic to: (i) transmit current location information of the flying drone device to a drone flight management system; (ii) receive from the drone flight management system a configurable flight zone database that comprises locations that are designated as configurable flight zones; and (iii) automatically adjust a flight direction of the flying drone device based on the configurable flight zone database to navigate around the locations that are designated as configurable flight zones.

According to some embodiments, the present disclosure is directed to a method comprising: (a) transmitting current location information of a flying drone device to a drone flight management system; (b) receiving from a drone flight management system a configurable flight zone database that comprises locations that are designated as configurable flight zones; and (c) automatically adjusting a flight direction of the flying drone device based on the configurable flight zone database to navigate around the locations that are designated as configurable flight zones.

According to some embodiments, the present disclosure is directed to a flying drone device, comprising: (a) a processor; and (b) a memory for storing logic, the processor executing the logic to: (i) transmit current location information of the flying drone device to a drone flight management system; (ii) receive from the drone flight management system a configurable flight zone database that comprises locations that are designated as configurable flight zones; (iii) automatically adjust a flight direction of the flying drone device based on the configurable flight zone database to navigate around the locations that are designated as configurable flight zones; (iv) receive dynamic flight restriction signals during flight; and (v) further automatically adjust a flight direction of the flying drone device based on the dynamic flight restriction signals.

In another embodiment, a method comprises (a) receiving position information from a user associated with a property identified by the position information; (b) assembling the position information with other position information to compile a comprehensive configurable flight zone database; and (c) pushing the configurable flight zone database to at least one drone, the drone accessing the configurable flight zone database to determine if at least one behavior is not permitted, the drone being programmed to restrict the at least one behavior when proximate or within areas identified in the configurable flight zone database

DETAILED DESCRIPTION

Various exemplary embodiments of the present technology provide systems and methods for establishing configurable flight zones (also referred to herein as personal airspace exclusion zones and no-fly areas) for drones. Individuals or organizations interested in preventing, limiting, calibrating, or monitoring access by drones to airspace above a property (or another's property) may input information into a database of configurable flight zones. Drone manufacturers may program drones during the manufacturing process, or establish an updating protocol during operation, charging or at any other appropriate time. During programming or updating, the drone receives information related to configurable flight zones, and thereafter is programmed to avoid flying into, and/or photographing, configurable flight zones. Other drone behaviors can also be controlled with configurable flight zones to avoid trespass and nuisance, as well as increase safety and security for property owners. Thus, drone behaviors can be restricted when flying both into and proximate configurable flight zone locations in some embodiments.

In general, the present disclosure allows for the creation and implementation of a database that allows an entity to specify airspace limitations that define types, times, behaviors, actions, and other attributes of drones that operate in proximity or within a location defined by the entity. The location could include, for example, land that any particular person or entity controls, for example a city, park authority, or a private property. In one example use case, an individual can configured a database record that allows a drone to land on or fly over their property only during business hours; or it may allow delivery drones but not camera drones.

The configurable flight zone databases of the present disclosure allow for restriction of at least one behavior of a drone when operating within or near a location defined by an entity. The behavior can comprise whether the drone is allowed to fly within or proximate the zone, whether certain instruments of the drone can be used such as cameras, an altitude of the drone, and so forth.

Drones are increasingly popular, but are currently lightly regulated or unregulated in the private sphere, and prohibited in some commercial spheres, depending on the country or local laws. Additionally, enforcement of any regulations is difficult and inconsistent. Commercial drone operation is currently prohibited, but will likely soon become commonplace, for example, for deliveries. People are concerned about drones for safety reasons (i.e., concerns about being struck by a drone), for privacy reasons, for reasons of trespass and land use, and for reasons of nuisance. The Federal Aviation Agency (FAA) regulates air travel in the United States, and generally allows travel through airspace above 500 feet. Drones are typically height limited to 400 feet, and therefore may pass through private airspace if traveling above private property.

The technology disclosed herein provides a system and method for controlling drones and preventing them from trespassing, violating property rights, or otherwise accessing prohibited areas. In this manner, drone operators and manufacturers may limit their liability and society may derive the benefits of drone technology, while mitigating their costs. Likewise, property owners or other responsible parties (hereinafter referred to as users) may prevent, control, calibrate, or monitor access to a private area and/or a controlled area. Users input address or location information into a database, for example an online form or internet webpage. The users may be required to verify ownership or control of the property. The system may use the address to determine a location, for example latitude and longitude coordinates, or alternatively by any other appropriate location designation.

The system may use the location to create a no-fly area (in some embodiments), which may be a circle or square, a column of airspace, or other shape positioned around the location. The size of the circle or other shape may be a function of the density of the area, or may be predefined, or may be selectable by the user or a database operator (also referred to herein as a controller). Alternatively, the system may access property records based on the address and identify the exact shape of the property being identified. Then the property shape, with or without a buffer zone of a predefined or selectable amount, may be determined. The property, or the circle or other shape, may then identify a no-fly area, for example. The no-fly area is an example of a configurable flight zone that may be added to a database to form a comprehensive configurable flight zone database. The configurable flight zone database may also include information related to prohibited flying areas, for example airports, military facilities, schools, nuclear plants, and so forth.

The configurable flight zone database may be accessed by a drone manufacturer or operator, and may be downloaded to a drone. A communication protocol, and/or data format may be utilized which may be specific to types of drones, or alternatively may be standardized. Drones may be programmed to respect the areas identified in the configurable flight zone database and not to fly into them. Additionally, drones may be programmed to not direct any onboard cameras into a configurable flight zone, or to use special software such as auto redaction software when entering a specified area. The disabling of a camera or redaction of imagery gathered may therefore be dependent on both a position and an orientation of a drone. The position and orientation of the drone may be determined based on an initial position, acceleration, velocity information, GPS, compass bearing, and/or from any other appropriate position and orientation information source.

The configurable flight zone database may be delivered to a drone manufacturer periodically to include updates. Alternatively, a Wi-Fi enabled or other Internet connected drone may update the configurable flight zone database or file during operation and/or charging. The present technology may thereby aggregate the privacy preferences and/or access rights published and/or requested by many individuals and/or entities, and disburse those preferences and/or rights to many nodes, for example drones. In one embodiment, drones could share info as a mesh network.

The completeness of the configurable flight zone database, including government determined controlled, restricted and prohibited flight areas as well as user input configurable flight zone areas, is a selling point for manufacturers as it enables their intelligent devices to automatically respect policy and societal preferences. Use of the configurable flight zone database limits the liability of the drone manufacturer by limiting or eliminating the damage possibly caused by the drones produced. The categories of configurable flight zones may be selectable by a manufacturer. In this manner, a drone produced for the military may not include the configurable flight zones of military facilities, and/or may be modified in any appropriate way by the database operator, the drone manufacturer and/or drone operator.

In further exemplary embodiments, certain types of passage by a drone over private property may be permitted by a user designating the area a configurable flight zone area. For example, a user may allow drones delivering packages to land and takeoff from the property when delivering packages there. Additionally or alternatively, a user may allow drones to pass over the designated configurable flight zone area if the drone operator agrees to pay a fee for passage.

Figure 1:
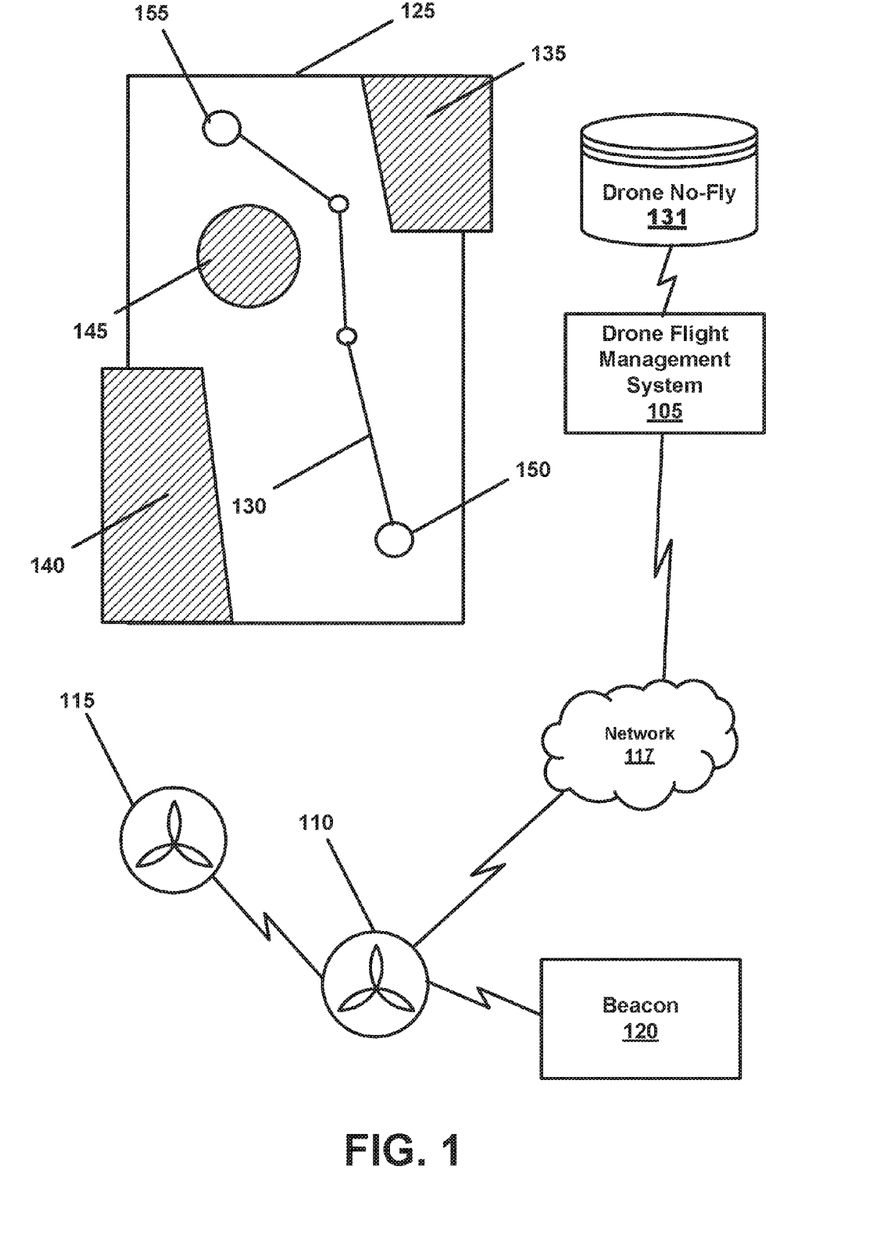
FIG. 1 is a schematic diagram of an example system used to practice aspects of the present disclosure, as well as an example approved flight path relative to locations both included and not included in a configurable flight zone database.

FIG. 1 is an example architecture that comprises a drone flight management system (hereinafter "system 105"). The system 105 can communicatively couple with one or more drones such as drone 110 and drone 115. Each of the drones can comprise flying drones such as quad-copter or other similar aerial vehicles.

The system 105 may communicatively couple with the drone 110 or the drone 115 via a public or private network, such as network 117. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 117 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 105 generally comprises at least a processor, a network interface, and a memory. According to some embodiments, the memory comprises logic (e.g., instructions) that can be executed by the processor to perform various methods. The drones can also comprise at least a processor, a network interface, and a memory, as well as logic stored in memory to selectively control movement to avoid configurable flight zones, as described in greater detail herein. In some embodiments, the system 105 can store and retrieve configurable flight zone database information, as well as proposed and approved flight plans in a configurable flight zone data store 131.

In some embodiments, the drones 110 and 115 can communicatively couple with one another and create an ad-hoc network. The drones can exchange flight plans or configurable flight zone database information with one another. For example, drone 110 can receive a configurable flight zone database from the system 105 and forward the configurable flight zone database to the drone 115. In some embodiments, a plurality of drones may form a network such as a mesh network. These drones can share information with one another that may affect a current flight plan of a drone. For example, a first drone that is in a location along an approved flight path of another drone may report current weather or other flight related information to a second drone. The second drone is configured to receive the information and selectively alter its approved flight plan if the weather or other received flight information indicates that the approved flight path is dangerous or otherwise disadvantageous.

According to some embodiments, the drones can transmit or receive information through beacons, such as beacon 120. The beacon 120 can be a standalone device or a device integrated into, for example, a tower or building. In one example, the beacon is integrated into an emergency response vehicle, such as a police car. The beacon can be used to broadcast configurable flight zones that are not included in the configurable flight zone database. The beacon 120 can be activated to broadcast a signal that when received by the drone 110 informs the drone 110 to alter or deviate around the configurable flight zone created by the beacon 120. In some embodiments, the beacon 120 can be configured to create a patterned configurable flight zone such as a circle, square, or other shaped area. The size and shape can be determined by an end user. As the drone 110 flies into proximity to the beacon 120, the drone 110 receives the signal output by the beacon 120 and selectively adjusts its flight based on the received signal.

In some embodiments, the beacon 120 can push its signal to the system 105 that updates the configurable flight zone database. The updated database is pushed to the drone 110 by the system 105. This embodiment is advantageous when the drone 110 cannot communicate with the beacon 120 without entering the configurable flight zones established by the beacon 120.

The drone 110 is configured to receive tactical aircraft navigation signals (TACAN) from a radio beacon 120 that utilizes VHF omnidirectional range signals and/or distance measuring equipment (DME) to establish a dynamic or static configurable flight zone for drones. Thus, the drone 110 can be equipped with required avionics for receiving and interpreting these signals.

Thus, an approved flight plan for the drone 110 can include a static set of information received prior to or during flight. Also, dynamic information (e.g., dynamic flight restriction signals) can be used to selectively alter the movement of the drone 110 such as beacon signals, weather information, terrain awareness warning signals (TAWS), terrain inhibit switch (TIS) signals, weather information such as NEXRAD, pilot reports of turbulence (PIREPS), automatic dependent surveillance broadcast (ADS-B) signals, as well as other similar signals that would be known to one of ordinary skill in the art with the present disclosure before them.

According to some embodiments, the system 105 is configured to receive a proposed flight request or plan for a drone and generate an acceptable or approved flight plan by application of the configurable flight zone database information to ensure that the proposed flight plan does not include a flight path that causes the drone to operate in designated configurable flight zones or locations.

In other embodiments, the system 105 can generate a flight plan for a drone knowing a starting location (which can include a current location) and a desired destination.

The system can push configurable flight zone database information to the drone through cellular networks, Wi-Fi networks, or through mesh networks created by drones where one or more drones are in communication with the system 105 and pass configurable flight zone data between network members.

FIG. 1 also illustrates an example approved flight plan 125 that includes a flight path 130. The flight path 130 navigates through a plurality of configurable flight zones such as zone 135 and zone 140 which both comprise configurable flight zones defined by property owners. Zone 145 is a temporary or transient configurable flight zone that is created by a beacon. Again, the zone 145 can include a size and shape that is user defined. In this instance the zone is a circular configurable flight zone with a defined radius. In an embodiment where the zone 145 was shut down by the user the system 105 could reroute the drone if the removal of the zone 145 would create a more effective or desirable flight plan.

As mentioned above, the system 105 can create the flight path from the configurable flight zones 135, 140, and 145 as well as a current location 150 of the drone and a destination location 155.

To be sure, while the approved flight plan 125 has been illustrated as a visual route representation it will be understood that the flight plan 125 can include a list of logical instructions that are executable by the drone.

In one embodiment the drone is provided with the configurable flight zone database. The configurable flight zone database comprises coordinates of locations listed as configurable flight zone properties. The drone can be configured to compare its current location to the configurable flight zone database and selectively adjust its flight path, either in direction, altitude, or combinations thereof to prevent the drone from encountering a configurable flight zone.

Figure 2:
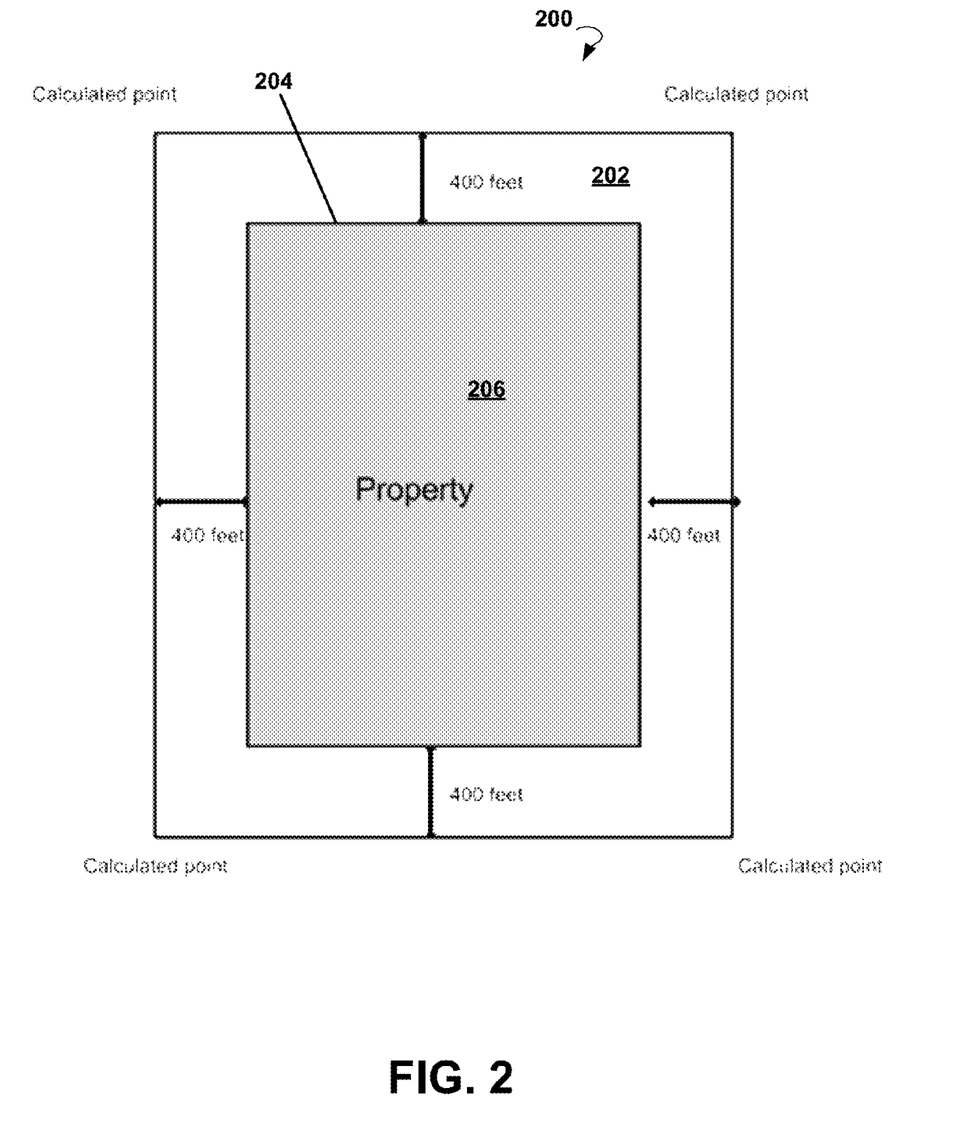
FIG. 2 is a diagram illustrating a configurable flight zone tied to property lines according to an example embodiment.

FIG. 2 is a diagram of a configurable flight zone 200. The configurable flight zone 200 may be designated by a user or other responsible person by reference to an address. The exemplary system may access a property database to determine property lines, in some embodiments. The system may additionally add a buffer zone 202 of a predetermined or user selectable distance from a property line 204, and may include a property area 206 plus the buffer zone 202 in a configurable flight zone database. The database may be uploaded during manufacture, or uploaded and updated in real-time during operation and/or charging of a drone. The configurable flight zone may also identify a no-look zone, in which the drone is prohibited by internal programming from directing a camera into the configurable flight zone 200.

Figure 3:
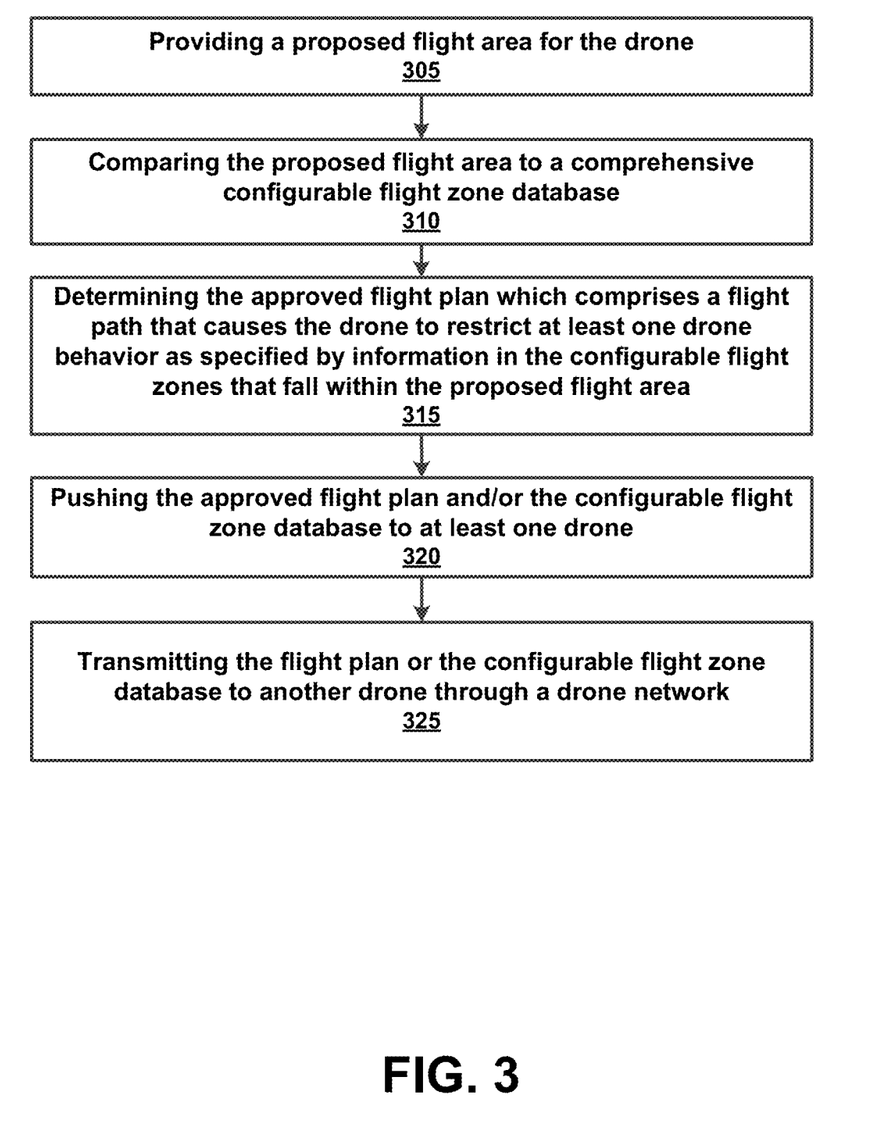
FIG. 3 is a flowchart of an example method of the present disclosure.

FIG. 3 is a flowchart of an example method of the present disclosure. For context, the method is executed cooperatively between the system 105 and one or more drones. Initially, the drone and system are in coupled communication either when the drone is stationary/grounded or when the drone is airborne. The method can include the drone providing 305 a proposed flight area for the drone. This proposed flight area could include an initial or current position of the drone. In another embodiment the proposed flight could include the current position of the drone and a destination location for the drone.

The method then includes the system generating an approved flight plan for the drone by comparing 310 the proposed flight area to a comprehensive configurable flight zone database. As mentioned above, the configurable flight zone database comprises position information for locations that are designated as configurable flight zones. The position information can include any location information that allows for the determination of a perimeter (or other geographical description) of a configurable flight zone.

The method can then include the system determining 315 the approved flight plan which comprises a flight path that causes the drone to restrict at least one drone behavior as specified by information in the configurable flight zones that fall within the proposed flight area.

As mentioned above, this can include controlling at least one behavior of the drone such as preventing flight of the drone in a defined location or buffer zone, restrictions of time such that the drone can fly over the location at night but not during the day, as well as drone type restrictions such as allowing commercial but not private drones. Other restrictions can include camera restrictions and altitude restrictions.

In some embodiments, the approved flight plan can include no-look zones or other similar privacy restricted areas. These locations are referred to herein as privacy enhanced locations. In some embodiments, a privacy enhanced location is defined by attributes such as no-look, buffer zone size, altitude restricted (where fly-over is permitted by only when the drone is at a certain altitude), and combinations thereof. The owner of the location can add their privacy enhanced attributes to the database as desired.

When the system has completed creation of the flight plan the method can include pushing 320 the approved flight plan and/or the configurable flight zone database to at least one drone. As mentioned above, this process can include the system transmitting the approved flight plan to the drone over a network or alternatively the drone receives the flight plan from another drone with which it is communicating.

In addition to the flight plan, or in place of the flight plan, the method can include transmitting the configurable flight zone database, or at least a part thereof.

In some embodiments, the method can include transmitting 325 the flight plan or the configurable flight zone database to another drone through a drone network.

Figure 4:
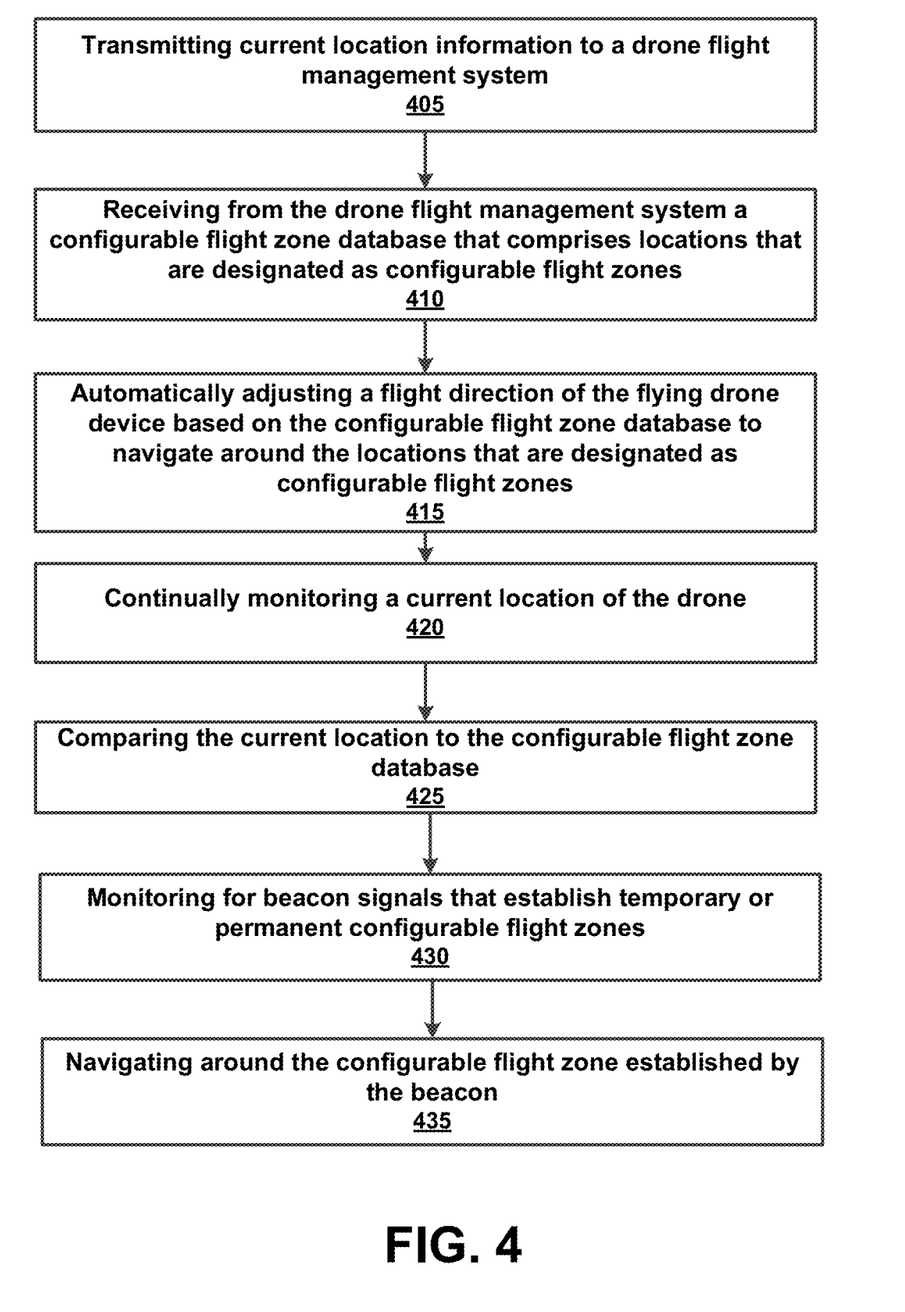
FIG. 4 is a flowchart of another example method of the present disclosure.

FIG. 4 illustrates another method that is executed by a drone configured to operate according to the present disclosure. In this method, a drone is configured to receive and implement a configurable flight zone database to control its flight.

The method can include the drone transmitting 405 current location information to a drone flight management system. For example, the drone can sense its location through GPS, triangulation, or other location sensing/determining methods. The drone can send its current location through a wireless network.

The system can determine a location where the drone is operating and select an appropriate or corresponding portion of the configurable flight zone database that corresponds to the current location of the drone. In other embodiments the system can retrieve the entire configurable flight zone database.

The method further includes receiving 410 from the drone flight management system a configurable flight zone database that comprises locations that are designated as configurable flight zones. Next, the method includes automatically adjusting 415 a flight direction of the flying drone device based on the configurable flight zone database to navigate around the locations that are designated as configurable flight zones.

The drone can accomplish this task by continually monitoring 420 a current location of the drone and comparing 425 the current location to the configurable flight zone database. If the control system of the drone determines that the drone is in proximity to a configurable flight zone the control system can selectively adjust a flight direction of the drone.

Also, the method can include monitoring 430 for beacon signals that establish temporary or permanent configurable flight zones. These configurable flight zones may or may not be associated with a location, such as a parcel of property. These configurable flight zones can include zones that are established on-the-fly, such as when law enforcement desires to establish a configurable flight zone for an event.

If a configurable flight zone established by a beacon is sensed, the method comprises navigating 435 around the configurable flight zone established by the beacon. Thus, in some embodiments, the drone is configured or equipped to sense the output of beacons that create these configurable flight zones. A specific schema for beacon broadcast and drone reception can be implemented.

The following paragraphs comprise example use cases for application of the present disclosure.

In an example use case a drone is prepared for operation by connecting the drone with a drone management system. For example, the drone can communicate with the system over a Wi-Fi network when the drone is grounded (e.g., prior to flight). The drone can receive the entire configurable flight zone database from the system or at least a portion of the database that corresponds to an area of operation for the drone. For example, if the drone is configured to operate in a city or portion of a city, the drone need only receive configurable flight zone database information for the relevant area over which the drone will operate.

Once the drone receives the database information the drone can be launched for operation. As the end user flies the drone the drone can utilize the database by comparing its current location against the database to determine if the drone is being flown into a location that is designated as a configurable flight zone. In some embodiments the drone is configured to use air traffic agnostic GPS from transponders to determine its current location. In other instances, the drone can comprise a GPS module or other location sensing device.

As the drone approaches the configurable flight zone the drone can warn the user that the done is approaching a configurable flight zone. For example, if an end user is flying a drone in their neighborhood, some neighbors may list their homes in the configurable flight zone database. Thus, the end user will be prevented from flying their drone into parcels within their neighborhood that are listed in the database.

If the end user ignores the warning signals, the drone can automatically adjust its direction of travel to maintain distance from configurable flight zones or buffer zones in some embodiments.

Also, as mentioned above, the drone can also implement enhanced security features such as camera restriction, altitude modification, and so forth.

The drone can be flown by an end user or optionally through automatic programming. That is, drones of the present disclosure can be autonomous and controlled by a computing device. Thus, in addition to the database the drone will also receive a flight plan in some embodiments. For example, the system can receive a Foreflight™ or preflight set of instructions for the drone.

In some embodiments, the system can optimize the flight plan using the database by comparing a proposed flight plan for the drone against the database and generate an approved flight plan that excludes any configurable flight zone locations that exist along the proposed flight plan.

In one example, the drone can receive parameters for any given area for exclusion on TFR (temporary flight restrictions) transmitted to database. Thus, the database can include both permanent entries and temporary entries (transient restrictions). If an adverse event causes the Federal Aviation Administration or any other airspace authority to close airspace, the TFR messages can be received and locations associated with the TFR messages added to the configurable flight zone database.

The above-described features are exemplary of static or database-driven flight parameters for a drone. The following examples include dynamic flight restriction based on flight restriction signals received during flight. Again, the drones of the present disclosure can be configured to use both static, database-driven flight restrictions, as well as dynamic flight restrictions.

In one example, the drone is operating in an area where weather may pose a risk to the operation of the drone. Thus, the flight path of the drone can be altered based on weather warning signal such as NEXRAD (Next-Generation Radar) report cell area messages or IFR (Instrument Flight Rules) or turbulence such as PIREPS (Pilot Reports). The weather warning signals can indicate that the drone should stay out of a designated area. Thus, the drone is configured to compare weather warning signals to thresholds or rules that indicate when a weather warning signal indicates that operation of the drone is undesirable. For example, if NEXRAD radar information indicates that hail or high winds are in an area, the drone can automatically adjust its flight path to avoid this area.

The drone can also be configured to receive TIS (Traffic Information Service) information or information of another aircraft in the same vicinity. The drone can use these signals to determine if a location is too crowded to operate within or to determine if altitude or flight path adjustments need to be made to avoid collisions (or safe proximity operation) with other aircraft.

Live traffic information can also be used to create no fly zone. This information can include air traffic control messages or pilot communications. In one embodiment, the system is configured to ingest streams of live flight data into a real-time database. The system performs computations to determine potential conflicts between aircraft (manned or unmanned), and then sent alerts or control instructions to operators of the manned or unmanned aircraft.

In one embodiment, information from ADS-B other aircraft traffic, military aircraft at a low altitude, as well as other military signals can also be received and used to automatically alter the flight of the drone.

As mentioned above, the drone is configured with appropriate avionics to receive and interpret these various dynamic signals that can be utilized to restrict the flight area of the drone.

Figure 5:
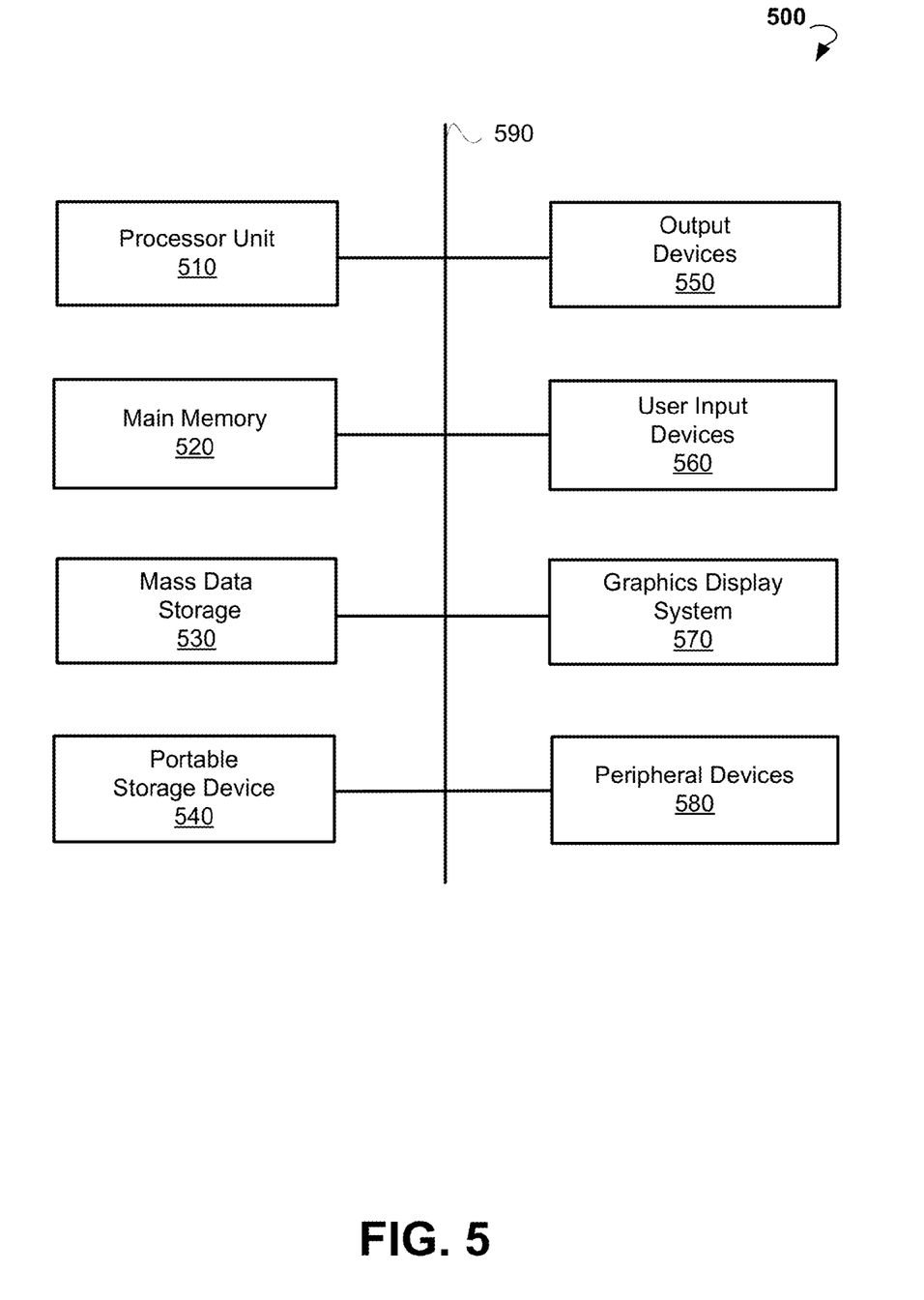
FIG. 5 illustrates an example computer system that can be used to implement embodiments of the disclosed technology.

Various embodiments of the present technology can be practiced with a local computer system, and/or a cloud-based system. FIG. 5 illustrates an exemplary computer system 500 that may be used to implement some embodiments of the present disclosure. The computer system 500 of FIG. 5 may be implemented in the contexts of the likes of computing systems, networks, servers, or combinations thereof. The computer system 500 of FIG. 5 includes one or more processor units 510 and main memory 520. Main memory 520 stores, in part, instructions and data for execution by processor units 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral devices 580 may include any type of computer support device that adds additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, comprising:
at a first drone:
navigating along an approved flight plan, the approved flight plan based on a first set of information that indicates one or more restricted areas into which the first drone cannot enter, wherein the approved flight plan does not enter the one or more restricted areas;
while navigating along the approved flight plan, receiving, at the first drone, a second set of information, different than the first set of information, that indicates one or more conditions at a location along the approved flight plan; and
in response to receiving, at the first drone, the second set of information:
in accordance with a determination that the second set of information satisfies first criteria, maintaining the navigating along the approved flight plan, including through the location along the approved flight plan; and
in accordance with a determination that the second set of information satisfies second criteria, different than the first criteria, altering the approved flight plan to create an altered approved flight plan, the altered approved flight plan not entering the location.

2. The method of claim 1, wherein:
the second set of information comprises weather information for the location,
the second set of information satisfies the first criteria if the weather information indicates travel through the location is dangerous, and
the second set of information satisfies the second criteria if the weather information indicates travel through the location is not dangerous.

3. The method of claim 1, wherein:
the second set of information is received from a second drone, different from the first drone.

4. The method of claim 1, wherein:
the approved flight plan comprises a flight plan from an initial location to a destination location, and
the altered approved flight plan comprises a flight plan from the initial location to the destination location.

5. The method of claim 1, wherein:
the second set of information satisfies the first criteria if the one or more conditions indicate travel through the location is dangerous, and
the second set of information satisfies the second criteria if the one or more conditions indicate travel through the location is not dangerous.

6. The method of claim 1, wherein the second set of information comprises one or more of beacon signals, weather information, terrain awareness warning signals (TAWS), terrain inhibit switch (TIS) signals, pilot reports of turbulence (PIREPS) and automatic dependent surveillance broadcast (ADS-B) signals.

7. The method of claim 1, further comprising:
receiving, at the first drone, a third set of information, the third set of information indicating one or more restrictions for a first type of function and a second type of function of the first drone,
the one or more restrictions associated with a defined location along the approved flight plan; and
while navigating along the approved flight plan:
in accordance with a determination that the first drone is at the defined location along the approved flight plan, and that the third set of information indicates that the first type of function is restricted at the defined location, restricting the first type of function while the first drone is at the defined location; and
in accordance with a determination that the first drone is at the defined location along the approved flight plan, and that the third set of information indicates that the second type of function is not restricted at the defined location, not restricting the second type of function while the first drone is at the defined location.

8. The method of claim 7, wherein the first type of function comprises navigation functions of the first drone, and the second type of function comprises camera functions of the first drone.

9. The method of claim 1, further comprising:
prior to flight and navigating along the approved flight plan, receiving, at the first drone, the approved flight plan.

10. A first drone comprising:
one or more processors; and
memory coupled to the one or more processors, the memory storing instructions, which when executed by the one or more processors, cause the first drone to perform a method comprising:
navigating along an approved flight plan, the approved flight plan based on a first set of information that indicates one or more restricted areas into which the first drone cannot enter, wherein the approved flight plan does not enter the one or more restricted areas;

while navigating along the approved flight plan, receiving, at the first drone, a second set of information, different than the first set of information, that indicates one or more conditions at a location along the approved flight plan; and in response to receiving, at the first drone, the second set of information:

in accordance with a determination that the second set of information satisfies first criteria, maintaining the navigating along the approved flight plan, including through the location along the approved flight plan; and in accordance with a determination that the second set of information satisfies second criteria, different than the first criteria, altering the approved flight plan to create an altered approved flight plan, the altered approved flight plan not entering the location.

11. A non-transitory computer-readable storage medium storing instructions, which when executed by one or more processors of a first drone, cause the first drone to perform a method comprising:

navigating along an approved flight plan, the approved flight plan based on a first set of information that indicates one or more restricted areas into which the first drone cannot enter, wherein the approved flight plan does not enter the one or more restricted areas;

while navigating along the approved flight plan, receiving, at the first drone, a second set of information, different than the first set of information, that indicates one or more conditions at a location along the approved flight plan; and in response to receiving, at the first drone, the second set of information:

in accordance with a determination that the second set of information satisfies first criteria, maintaining the navigating along the approved flight plan, including through the location along the approved flight plan; and in accordance with a determination that the second set of information satisfies second criteria, different than the first criteria, altering the approved flight plan to create an altered approved flight plan, the altered approved flight plan not entering the location.

12. The first drone of claim 10, wherein:

the second set of information comprises weather information for the location, the second set of information satisfies the first criteria if the weather information indicates travel through the location is dangerous, and the second set of information satisfies the second criteria if the weather information indicates travel through the location is not dangerous.

13. The first drone of claim 10, wherein:

the second set of information is received from a second drone, different from the first drone.

14. The first drone of claim 10, wherein:

the approved flight plan comprises a flight plan from an initial location to a destination location, and the altered approved flight plan comprises a flight plan from the initial location to the destination location.

15. The first drone of claim 10, wherein the method further comprises:

receiving, at the first drone, a third set of information, the third set of information indicating one or more restrictions for a first type of function and a second type of function of the first drone, the one or more restrictions associated with a defined location along the approved flight plan; and while navigating along the approved flight plan:

in accordance with a determination that the first drone is at the defined location along the approved flight plan, and that the third set of information indicates that the first type of function is restricted at the defined location, restricting the first type of function while the first drone is at the defined location; and in accordance with a determination that the first drone is at the defined location along the approved flight plan, and that the third set of information indicates that the second type of function is not restricted at the defined location, not restricting the second type of function while the first drone is at the defined location.

16. The first drone of claim 15, wherein the first type of function comprises navigation functions of the first drone, and the second type of function comprises camera functions of the first drone.

17. The non-transitory computer-readable storage medium of claim 11, wherein:

the second set of information comprises weather information for the location, the second set of information satisfies the first criteria if the weather information indicates travel through the location is dangerous, and the second set of information satisfies the second criteria if the weather information indicates travel through the location is not dangerous.

18. The non-transitory computer-readable storage medium of claim 11, wherein:

the approved flight plan comprises a flight plan from an initial location to a destination location, and the altered approved flight plan comprises a flight plan from the initial location to the destination location.

19. The non-transitory computer-readable storage medium of claim 11, wherein the method further comprises:

receiving, at the first drone, a third set of information, the third set of information indicating one or more restrictions for a first type of function and a second type of function of the first drone, the one or more restrictions associated with a defined location along the approved flight plan; and while navigating along the approved flight plan:

in accordance with a determination that the first drone is at the defined location along the approved flight plan, and that the third set of information indicates that the first type of function is restricted at the defined location, restricting the first type of function while the first drone is at the defined location; and in accordance with a determination that the first drone is at the defined location along the approved flight plan, and that the third set of information indicates that the second type of function is not restricted at the defined location, not restricting the second type of function while the first drone is at the defined location.

20. The non-transitory computer-readable storage medium of claim 19, wherein the first type of function comprises navigation functions of the first drone, and the second type of function comprises camera functions of the first drone.

* * * * *